United States Patent
Öztürk

(10) Patent No.: US 10,445,256 B2
(45) Date of Patent: Oct. 15, 2019

(54) FUNCTION CONNECTION UNIT

(71) Applicant: Phoenix Contact GmbH & Co. KG, Blomberg (DE)

(72) Inventor: Özkan Öztürk, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 91 days.

(21) Appl. No.: 15/675,379

(22) Filed: Aug. 11, 2017

(65) Prior Publication Data

US 2018/0046589 A1 Feb. 15, 2018

(30) Foreign Application Priority Data

Aug. 12, 2016 (DE) .......................... 10 2016 115 009

(51) Int. Cl.
*G06F 13/10* (2006.01)
*G06F 13/364* (2006.01)
(Continued)

(52) U.S. Cl.
CPC ....... *G06F 13/102* (2013.01); *G05B 19/0423* (2013.01); *G05B 19/0426* (2013.01);
(Continued)

(58) Field of Classification Search
CPC .................. G05B 2219/1215; G05B 2219/2231
(Continued)

(56) References Cited

U.S. PATENT DOCUMENTS 8,205,022 B2 * 6/2012 Isenmann ........... H04L 41/0806
710/305
8,249,726 B2 * 8/2012 Krumsiek ............ G05B 19/042
700/19
(Continued)

FOREIGN PATENT DOCUMENTS

DE 10 2007 054 417 A1 5/2009
DE 2011 006590 A1 5/2012
(Continued)

OTHER PUBLICATIONS

IO-Link Interface and System Specification Version 1.1.2; Dated Jul. 2013; 262 Pages (Year: 2013).*

*Primary Examiner* — Brian T Misiura
(74) *Attorney, Agent, or Firm* — Holland & Hart LLP

(57) ABSTRACT

The disclosure relates to a function connection unit for connecting at least one parameterizable functional module, including at least one functional module connection configured to connect to the at least one parameterizable functional module; a communication interface that is configured to receive first parameter data records, the first parameter data records including parameter data for parameterizing the at least one parameterizable functional module and first parameter indices that index a memory area for the parameter data; and a processor configured to convert the first parameter indices into second parameter indices to obtain second parameter data records, the second parameter indices indexing a predetermined memory area of the at least one parameterizable functional module for storing the parameter data in the at least one parameterizable functional module.

18 Claims, 3 Drawing Sheets

(51) Int. Cl.
*G06F 13/40* (2006.01)
*G06F 13/42* (2006.01)
*G05B 19/042* (2006.01)

(52) U.S. Cl.
CPC .......... *G06F 13/364* (2013.01); *G06F 13/404* (2013.01); *G06F 13/4282* (2013.01); *G05B 2219/25204* (2013.01)

(58) Field of Classification Search
USPC .......................................................... 700/3
See application file for complete search history.

(56) References Cited

U.S. PATENT DOCUMENTS

| | | | |
|---|---|---|---|
| 9,697,164 B2* | 7/2017 | Beyer | G06F 13/20 |
| 10,037,688 B2* | 7/2018 | Wessling | G05B 19/0423 |
| 10,089,271 B2* | 10/2018 | Feinaeugle | H04L 12/40032 |
| 2016/0291563 A1* | 10/2016 | Kumar | H04L 41/0883 |
| 2017/0264455 A1* | 9/2017 | Ozaki | G05B 19/054 |
| 2017/0300432 A1* | 10/2017 | Kitamura | G06F 13/16 |
| 2017/0366370 A1* | 12/2017 | Krumsiek | H04L 12/40019 |
| 2018/0113429 A1* | 4/2018 | Krumsiek | G05B 19/0423 |

FOREIGN PATENT DOCUMENTS

| | | |
|---|---|---|
| DE | 10 2011 107 321 A1 | 1/2013 |
| DE | 10 2014 119 101 A1 | 6/2016 |
| WO | WO 2015/075615 A1 | 5/2015 |

* cited by examiner

FUNCTION CONNECTION UNIT

CROSS-REFERENCE TO RELATED APPLICATIONS

This application claims priority to German patent application No. 10 2016 115 009.6, entitled "Funktionsanschlusseinheit", and filed on Aug. 12, 2016 by the Applicant of this application. The entire disclosure of the German application is incorporated herein by reference for all purposes.

BACKGROUND

The present disclosure relates to a function connection unit, for example an I/O master.

Function connection units, also called I/O masters, which operate according to the Single-Drop Digital Communication Interface for Small Sensors and Actuators (SDCI) protocol, for example, are usually used to connect and configure functional automation modules such as actuators or sensors. An example of an SDCI function connection unit is the I/O link master which is described in DE 10 2011 006590 A1, for example.

However, the functional modules connected to a function connection unit must be parameterized for the desired method of operation, that is to say must be configured in a device-specific manner. This is usually carried out by parameterizing the functional modules, in which case sensor sensitivities, for example, can be set. The functional modules are usually parameterized in advance in a module-specific manner by a service engineer by means of a special service interface, but this is associated with high outlay.

Therefore, the object of the present disclosure is to provide a more efficient concept for connecting functional automation modules.

SUMMARY

This object is achieved by means of the subject matters having the features according to the independent claims. The dependent claims, the description and the drawings relate to advantageous examples.

The present disclosure is based on the knowledge that the functional modules can be parameterized by means of a function connection unit if the function connection unit automatically converts the parameter data records, which are input by a user and are not module-specific, into module-specific parameter data records and transmits the latter to the respective functional module. The conversion relates, for example, to the change of the memory areas, which are indicated in the parameter data records and are generally non-specific, for the purpose of storing the parameter data in specific memory areas of the functional module in which the parameter data are intended to be stored.

This dispenses with the need for a special service interface for the purpose of parameterizing the functional modules. In addition, the function connection unit can automatically parameterize the functional modules on the basis of the parameter data records provided by the parameter memory.

The parameter data records may be created, for example, by a user using a computer and possibly activation software on the basis of a general parameter description which lists parameterizable parameters and is present in the form of an XML file, for example.

According to a first aspect, the disclosure relates to a function connection unit for connecting at least one parameterizable functional module, having: at least one functional module connection to which the parameterizable functional module can be connected; a communication interface which is configured to receive first parameter data records, the first parameter data records having parameter data for parameterizing the parameterizable functional module and first parameter indices which index a memory area for the parameter data; and a processor which is configured to convert the first parameter indices into second parameter indices in order to obtain second parameter data records, the second parameter indices indexing a predetermined memory area of the parameterizable functional module for storing the parameter data in the parameterizable functional module.

The parameter data records and/or the parameter indices may be retrieved during activation, so to speak during "start-up", of the function connection unit, for example from a control computer. This converts the function connection unit into the state for using the correct second parameter indices for the functional module. In this case, the function connection unit can detect the presence of the parameter data in order to manipulate the parameter data records and to adapt the parameter indices to the memory assignment to the parameter data in which they are intended to be stored, for example, in the functional module.

The memory area of the first parameter data records may be non-specific and may relate to other functional modules, for example. Converting the parameter indices allocates specific memory areas of the functional module, in which the parameter data are intended to be stored, to the parameter data. This ensures that the parameter data are stored in the functional module at the memory addresses respectively provided for this purpose.

The parameter data records may be present in a data format which is determined by a parameter length and/or by a number of parameter data items.

The function connection unit may be configured to detect the parameter data records or the parameter indices in the parameter data records and to replace the first parameter indices with the second parameter indices.

The respective parameter data records enable device-specific parameterization or configuration of the functional modules. The parameter data records and their parameter data may indicate, for example, technical sensitivities, switching delays, characteristic curves or ranges of values of the functional modules. The parameter data records may also indicate information for identifying the functional modules, process and diagnostic data, communication properties and the structure of the user interface in engineering tools. The parameter data records may be present in the form of one or more files, for example a main file and an optional external voice file, for example in XML format. The parameter data records may also comprise image files in PNG format. In the context of the I/O link technology, the parameter data records may be present in an I/ODD (I/O Device Description) file.

The functional modules are, for example, sensors or actuators according to the IEC 61131-9 standard.

This achieves the technical advantage that a special service interface no longer has to be provided for the purpose of parameterizing the functional modules, for example sensors or actuators. In addition, an external communication connection, for instance a field bus, is not needed to parameterize the functional modules.

The communication protocol used to communicate with the functional modules may be a communication protocol according to I/O link or "Single-Drop Digital Communication Interface for Small Sensors and Actuators (SDCI)". The I/O link is a point-to-point interface for the functional module connection of any desired sensors and actuators to a control system, for example. According to SDCI, functional modules, for example sensors and/or actuators, are connected in accordance with the IEC 61131-9 standard.

In one advantageous example, the function connection unit is a master according to the SDCI protocol, for example an I/O link master. It is therefore possible to connect intelligent functional modules, for example sensors and/or actuators, according to the IEC 61131-9 standard.

In one advantageous example, the function connection unit also has a parameter data memory, the parameter data memory storing a conversion rule which indicates the conversion of the first parameter indices into the second parameter indices, and the processor being configured to read the conversion rule from the memory and to convert the first parameter indices into the second parameter indices according to the conversion rule.

The conversion rule may indicate, for example, the memory areas of the functional module in which the parameter data are intended to be stored.

In one advantageous example, the second parameter indices index or form at least one memory address of the parameterizable functional module. In this manner, the memory address intended for the parameter data is indicated to the parameter data.

In one advantageous example, the first parameter data records or the second parameter data records have an activation field which indicates activation or deactivation of the parameter data. This makes it possible to advantageously determine which parameter data are intended to be adopted, for example.

In one advantageous example, the processor is configured to change the arrangement of the parameter data by changing an order of the first parameter indices in order to obtain the second parameter data records. In this manner, the order of the parameter data or of the memory addresses of the memory areas intended for the parameter data is changed.

In one advantageous example, the first parameter data records have a first parameter representation, the processor being configured to convert the first parameter representation into a second parameter representation in order to obtain the second parameter data records in the second data format.

In one advantageous example, the first parameter data records comprise a first numerical value, the processor being configured to convert the first numerical value into a second numerical value which can be interpreted by the parameterizable functional module or which is in a number range of the parameterizable functional module in order to obtain the second parameter data records.

In one advantageous example, the first parameter data records comprise a first number representation, for example a binary, decimal or hexadecimal number representation, the processor being configured to convert the first number representation into a second number representation, for example a binary, decimal or hexadecimal number representation, in order to obtain the second parameter data records.

In one advantageous example, the first parameter data records and/or the second parameter data records comprise a parameter length and/or a parameter value.

In one advantageous example, the communication interface comprises an input interface, for example a graphical user interface or a keyboard, for manually inputting the first parameter data records.

In one advantageous example, the communication interface is configured to transmit data according to a communication protocol, for example according to the USB protocol.

In one advantageous example, sensors and/or actuators can be connected to the function connection unit as parameterizable functional modules.

According to a second aspect, the disclosure relates to a method for parameterizing a parameterizable functional module by means of a function connection unit to which the parameterizable functional module is connected via a functional module connection, comprising: receiving first parameter data records for parameterizing the parameterizable functional module, the first parameter data records having parameter data for parameterizing the parameterizable functional module and first parameter indices which index a memory area for the parameter data; converting the first parameter indices into second parameter indices in order to obtain second parameter data records, the second parameter indices indexing a predetermined memory area of the parameterizable functional module for storing the parameter data in the parameterizable functional module; and transmitting the second parameter data records to the parameterizable functional module by means of the function connection unit in order to parameterize the parameterizable functional module.

The method can be carried out by means of the function connection unit according to the first aspect.

In one advantageous example, the method is carried out during activation of the function connection unit.

In one advantageous example, in the receiving step, the first parameter data records are input by a user or are received from a control server via a communication network.

Further features of the method directly emerge from the functional features of the function connection unit according to the first aspect.

BRIEF DESCRIPTION OF THE DRAWINGS

Examples of the present disclosure are explained with reference to the accompanying drawings.

DETAILED DESCRIPTION OF THE DRAWINGS

Figure 1:
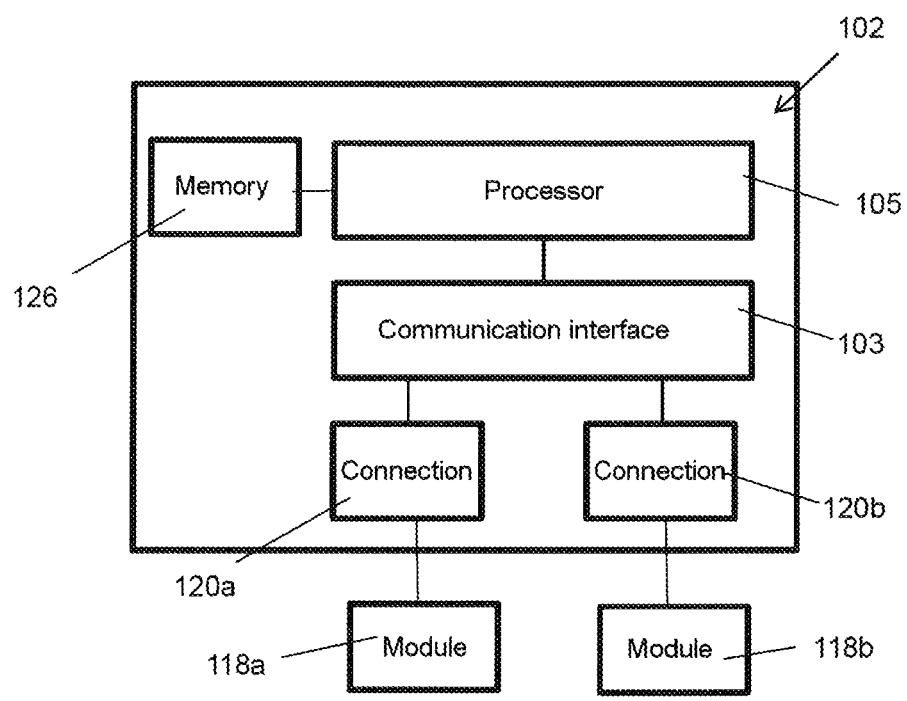
FIG. 1 shows a schematic illustration of a function connection unit.

FIG. 1 shows a function connection unit 102 for connecting at least one parameterizable functional module 118a, 118b, having at least one functional module connection 120a, 120b to which the parameterizable functional module 118a, 118b can be connected, a communication interface 103 which is configured to receive first parameter data records for parameterizing the parameterizable functional module 118a, 118b, and a processor 105 which is configured to convert the first parameter data records into second parameter data records. The processor 105 is also configured to provide the second parameter data records at the functional module connection for parameterizing the functional module connection 120a, 120b.

In order to convert the first parameter data records into the second parameter data records, the processor 105 may be configured to convert first parameter indices into second parameter indices. In this manner, those memory areas of the functional module which are intended for the respective parameter data are automatically assigned to the parameter data.

According to one example, the function connection unit 102 communicates with the parameterizable functional module 118a, 118b via a protocol according to I/O link or SDCI. The I/O link technology provides a point-to-point interface for the functional module connection of any desired sensors and actuators to a control system. Therefore, the function connection unit 102 may be an SDCI link master or an I/O link master, for example.

The functional modules 118a, 118b are actuators or sensors according to the IEC 61131-9 standard, for example.

According to one example, the function connection unit 102 can be connected to a field bus. The field bus may be, for example, PROFIBUS, PROFINET, Interbus, AS-i, EVA-CAT or Powerlink.

According to one example, the function connection unit 102 has functional module connections 120a, 120b which may be in the form of I/O ports in the present example. According to one example, the functional module connections 120a, 120b are in the form of I/O link-compatible or SDCI-compatible interfaces according to a communication protocol, for example I/O link or SDCI.

According to one example, the function connection unit 102 comprises a parameter data memory 126, the parameter data memory 126 storing a conversion rule which indicates the conversion of the first parameter data records in the first data format into second parameter data records according to the second data format, and the processor 105 being configured to read the conversion rule from the memory and to convert the first parameter data records into the second parameter data records according to the conversion rule.

Figure 2:
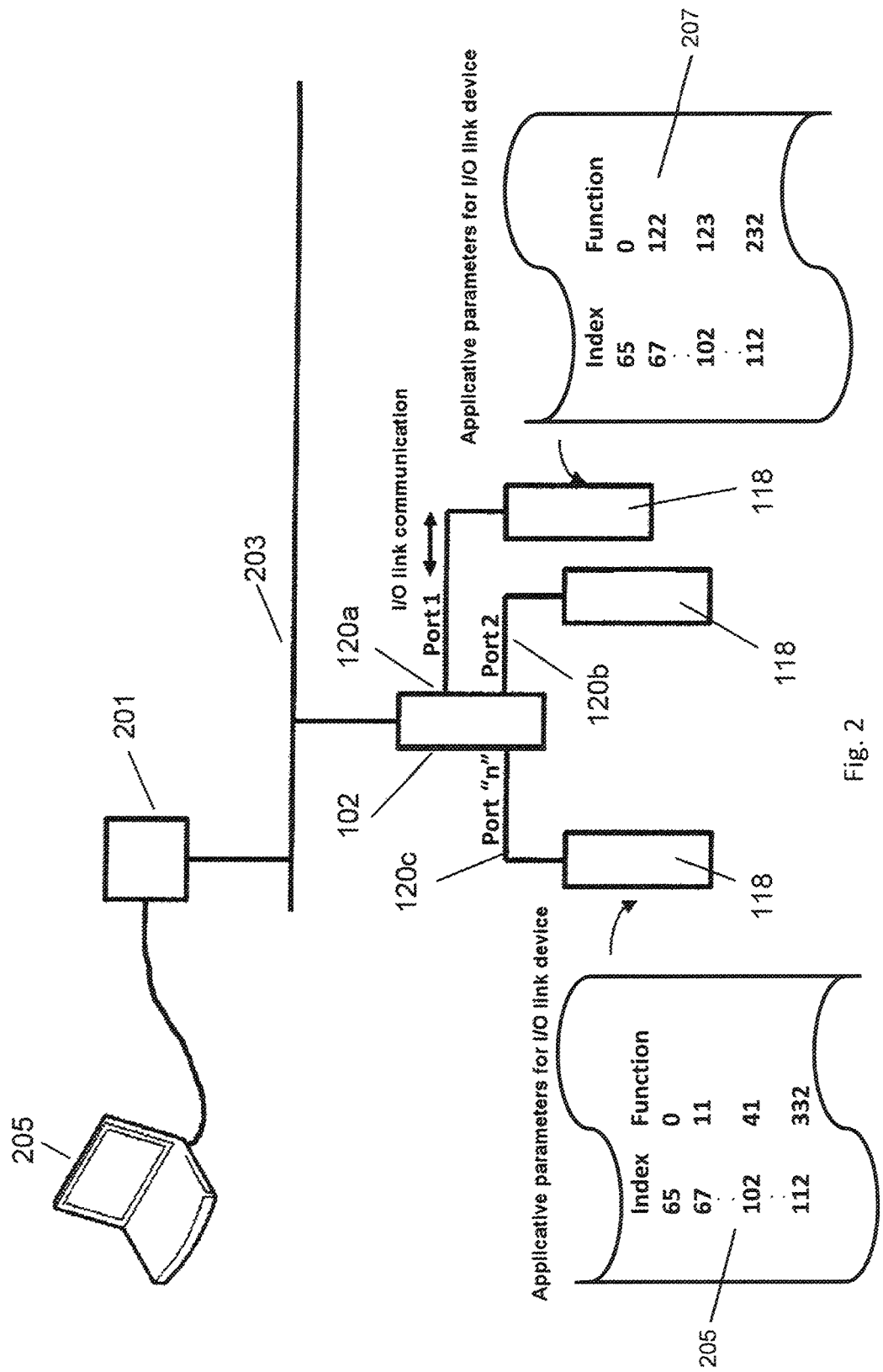
FIG. 2 shows a communication system.

FIG. 2 shows a communication system having the function connection unit 102, for example an I/O link master, which is connected to a higher-level control unit 201 or PLC 201 via a network/bus system 203. One or more different functional modules 118, for example I/O link devices, can be connected to the connections 120a-120c of the function connection unit 102. The functional modules 118 may be sensors, actuators or I/O stations. The functional modules 118 are available with parameters which are at factory settings, for example. An optional device entity 205, for example a computer, is also connected to the control unit 201.

FIG. 2 also illustrates exemplary first parameter data records 205 for the function connection unit 102 and second parameter data records 207 for the functional module 118.

These parameters can be changed and/or adapted on the respective functional module 118 for the respective application; functions on the respective functional module 118 can therefore be activated/deactivated or properties of the respective functional module 118 can be changed. In the case of I/O link functional modules 118, the parameters are on I/O link indices of the respective functional module 118 and are transmitted from the control unit 201 at a higher level than the function connection unit 102 to the function connection unit 102 by means of parameter set services.

The function connection unit 102 converts these data into a format which can be interpreted by the respective functional module 118 and transmits them to the respective functional module 118 by means of specific I/O link services, for example.

The function connection unit 102 transmits the parameters to the respective functional module 118.

Figure 3:
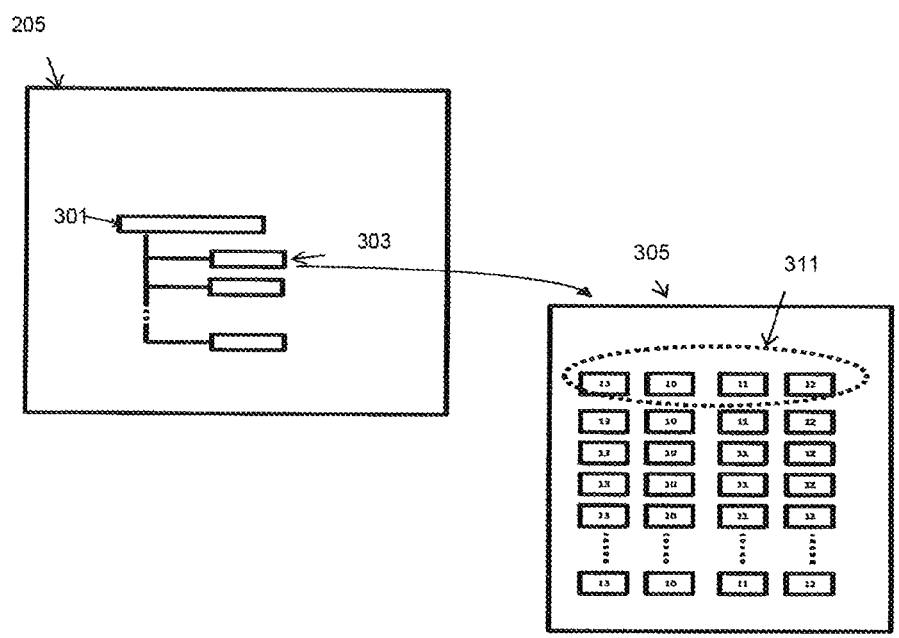
FIG. 3 shows a communication system.

As illustrated in FIG. 3, a user has the option of creating an entity 301, for example a software entity, of the function connection unit 102 in the engineering system 205 for the respective control unit 201 in the device entity 205 and of incorporating it, for example, at a connection (port) 303 of the entity 301 of the function connection unit 102, for example the I/O link parameterization module 305. Cyclical process data can be interchanged at the parameterization module 305 and a plurality of free parameter blocks 307 for the parameters are available to the user.

Each of the parameter blocks 311 in which parameter data can be arranged comprises, for example, an entry for the index 10, the length 11 of the parameter, the parameter value 12 and/or the use 13 of this parameter block 311.

In the index field 10, the user enters the parameter index (for example index address) which is predefined, for example, by an I/O link device manufacturer for the particular property or function. In the "length of the parameter" field 11, the user enters the parameter length provided by the I/O link device manufacturer for this index field. In the parameter value field 12, the user enters a parameter value which can be used to change the functions or properties of the functional module. In the "use of the parameter block" field 311, the respective parameter block can be activated/deactivated. The function connection unit 102 can or cannot transmit the parameters to the functional module, for example the I/O link device, depending on this value.

Therefore, the user can set the parameters required for his application in the device entity 205 for the control unit 201 at the entity of the function connection unit 102 at the respective port to which the respective functional module 118, for example the I/O link device, is connected. In one example, these parameter sets are transmitted as so-called "start-up parameters" at the beginning of the establishment of the communication relationship between the control unit 201 and the function connection unit 102. The function connection unit 102 interprets the parameter blocks and transfers the respective parameters to the indices of the functional module connected to the respective port or connection, for example by means of I/O link services.

What is claimed is:

1. A function connection unit for connecting at least one parameterizable functional module, comprising:
    at least one functional module connection configured to connect to the at least one parameterizable functional module;
    a communication interface configured to receive first parameter data records, the first parameter data records comprising parameter data for parameterizing the at least one parameterizable functional module and first parameter indices that index a memory area for the parameter data;
    a parameter data memory, the parameter data memory storing a conversion rule that indicates the conversion of the first parameter indices into the second parameter indices; and
    a processor configured to read the conversion rule from the memory and convert the first parameter indices into second parameter indices according to the conversion rule to obtain second parameter data records, the second parameter indices indexing a predetermined memory area of the at least one parameterizable functional module for storing the parameter data in the at least one parameterizable functional module.

2. The function connection unit according to claim 1, wherein the communication interface is configured to receive the second parameter indices from a control server during the activation of the function connection unit.

3. The function connection unit according to claim 1, wherein the function connection unit is a master according to the Single-Drop Digital Communication Interface for Small Sensors and Actuators (SDCI) protocol.

4. The function connection unit according to claim 1, wherein the second parameter indices being or indexing at least one memory address of the at least one parameterizable functional module.

5. The function connection unit according to claim 1, wherein the first parameter data records or the second parameter data records comprise an activation field that indicates activation or deactivation of the parameter data.

6. The function connection unit according to claim 1, wherein the processor is further configured to change the arrangement of the parameter data by changing an order of the first parameter indices to obtain the second parameter data records.

7. The function connection unit according to claim 1, wherein the first parameter data comprises:
   a first parameter representation; and
   the processor further configured to convert the first parameter representation into a second parameter representation to obtain the second parameter data records.

8. The function connection unit according to claim 1, wherein the first parameter data comprises:
   a first numerical value; and
   the processor further configured to convert the first numerical value into a second numerical value that is interpreted by the at least one parameterizable functional module or that is in a number range of the at least one parameterizable functional module to obtain the second parameter data records.

9. The function connection unit according to claim 1, wherein the first parameter data records and the second parameter data records comprise a parameter length of the parameter data, a parameter value of the parameter data, or both.

10. The function connection unit according to claim 1, wherein the communication interface comprises an input interface for manually inputting the first parameter data records.

11. The function connection unit according to claim 1, wherein the communication interfaces configured to transmit data according to a communication protocol.

12. The function connection unit according to claim 1, wherein sensors and actuators are configured to connect as parameterizable functional modules.

13. The function connection unit according to claim 3, wherein the function connection unit is an I/O link master.

14. The function connection unit according to claim 10, wherein the communication interface comprises a graphical user interface or a keyboard for manually inputting the first parameter data records.

15. The function connection unit according to claim 11, wherein the communication interface is configured to transmit data according to a USB protocol.

16. A method for parameterizing a parameterizable functional module using a function connection unit configured to connect to the parameterizable functional module via a functional module connection, comprising:
   receiving first parameter data records for parameterizing the parameterizable functional module, the first parameter data records comprising parameter data for parameterizing the parameterizable functional module and first parameter indices that index a memory area for the parameter data;
   storing a conversion rule that indicates the conversion of the first parameter indices into the second parameter indices;
   converting the first parameter indices into second parameter indices according to the stored conversion rule to obtain second parameter data records, the second parameter indices indexing a predetermined memory area of the parameterizable functional module for storing the parameter data in the parameterizable functional module; and
   transmitting the second parameter data records to the parameterizable functional module with the function connection unit to parameterize the parameterizable functional module.

17. The method according to claim 16, wherein the method occurs during activation of the function connection unit.

18. The method according to claim 16, further comprising:
   receiving the second parameter indices from a control server during the activation of the function connection unit.

* * * * *